(12) United States Patent
Chaudhry et al.

(10) Patent No.: US 6,848,071 B2
(45) Date of Patent: Jan. 25, 2005

(54) METHOD AND APPARATUS FOR UPDATING AN ERROR-CORRECTING CODE DURING A PARTIAL LINE STORE

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 499 days.

(21) Appl. No.: 10/061,521

(22) Filed: Jan. 31, 2002

(65) Prior Publication Data

US 2002/0157056 A1 Oct. 24, 2002

Related U.S. Application Data

(60) Provisional application No. 60/285,917, filed on Apr. 23, 2001.

(51) Int. Cl.$^7$ .............................................. G11C 29/00
(52) U.S. Cl. ...................... 714/763; 710/74; 365/103; 711/137
(58) Field of Search ........................... 714/763, 6, 764; 711/137, 100; 710/74; 365/103

(56) References Cited

U.S. PATENT DOCUMENTS

| | | | |
|---|---|---|---|
| 4,335,459 A | | 6/1982 | Miller |
| 5,537,573 A | * | 7/1996 | Ware et al. ................. 711/137 |
| 5,579,474 A | * | 11/1996 | Kakuta et al. ................. 714/6 |
| 6,161,208 A | * | 12/2000 | Dutton et al. ............... 714/764 |

FOREIGN PATENT DOCUMENTS

| | | |
|---|---|---|
| DE | 3942150 A1 | 12/1989 |
| EP | 0 743 601 A2 | 11/1996 |
| JP | 10055677 | 2/1998 |

OTHER PUBLICATIONS

JP patent Abstract, XP–002246944, Patent Abstracts of Japan, vol. 1998, No. 6, Apr.1998.

IBM Technical Disclosure Bulletin entitled "Caching Mechanism for 32–Bit ECC with Variable System Data Block Size", vol. 37, No. 1, Jan. 1994, XP–000428812, pp. 369–372.

Publication, entitled "Computer Organization and Architecture Principles of Structure and Function," by William Stallings, Ph.D., Macmillan Publishing Company, Collier Macmillan Publishers, pp. 99–106.

* cited by examiner

*Primary Examiner*—Albert Decady
*Assistant Examiner*—Dipakkumar Gandhi
(74) *Attorney, Agent, or Firm*—Park, Vaughan & Fleming, LLP (57) ABSTRACT

One embodiment of the present invention provides a system that updates an error-correcting code for a line when only a portion of the line is updated during a store operation. The system operates by receiving the store operation, wherein the store operation includes new data to be stored to the portion of the line, as well as an address of the portion of the line. Next, the system reads old data for the portion of the line from the address, and then stores the new data to the portion of the line at the address. The system also updates the existing error-correcting code for the line to reflect the new data. This involves calculating a new error-correcting code for the line from the existing error-correcting code, the old data and the new data. The system then replaces the existing error-correcting code with the new error-correcting code.

21 Claims, 6 Drawing Sheets

METHOD AND APPARATUS FOR UPDATING AN ERROR-CORRECTING CODE DURING A PARTIAL LINE STORE

RELATED APPLICATION

This application hereby claims priority under 35 U.S.C. §119 to U.S. Provisional Patent Application No. 60/285,917, filed on Apr. 23, 2001, entitled "Method And Apparatus for Updating an Error-Correcting Code During a Partial Line Store", by inventors Shailender Chaudhry and Marc Tremblay.

BACKGROUND

1. Field of the Invention

The present invention relates to the use of codes for error detection and/or error correction within a computer system. More specifically, the present invention relates to a method and an apparatus for updating an error-correcting code and/or an error-detecting code for a line when only a portion of the line is updated.

2. Related Art

As computer system memories continue to grow in size, it is becoming increasingly more common for transient errors to arise within the large volumes of code and/or data that are stored in these memories.

In order to remedy this problem, computer systems often employ error-correcting codes to correct transient errors that occur in a memory. When a data word is stored into the memory, the system automatically computes an error-correcting code for the data word that is stored along with the data word in the memory. When the data word is subsequently read from the memory, it is automatically compared against the error-correcting code. If a minor error has occurred, the error can be corrected through use of the error-correcting code. For example, a Hamming code can be used to correct any single-bit error and to detect any double-bit error occurring within a data word. See "Computer Organization and Architecture," by William Stallings, Macmillan Publishing Company, 1987, pp. 99–106.

However, such error-correcting codes have typically been deployed in the slower semiconductor main memory of a computer system. It has proven much harder to employ such error-correcting codes in faster cache memories.

Figure 1A:
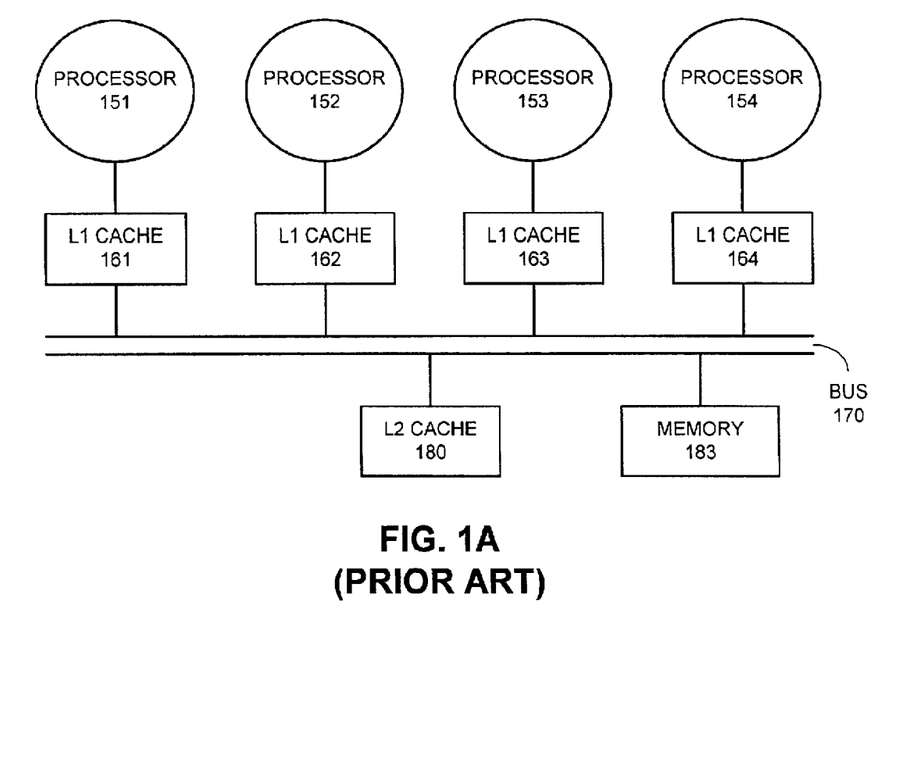
FIG. 1A illustrates a multiprocessor system.

FIG. 1A illustrates how cache memories can be organized in a multiprocessor system. This multiprocessor system includes a number of processors 151–154 with associated level one (L1) caches, 161–164, that share a single level two (L2) cache 180 and a memory 183 (see FIG. 1). During operation, if a processor 151 accesses a data item that is not present in its local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

As computer system performance continues to increase, it is advantageous for L1 caches 161–164 to be organized as "write-through" caches, so that all updates the L1 caches 161–164 are automatically propagated to L2 cache 180. This makes all updates to L1 caches 161–164 visible in L2 cache 180, and thereby eliminates the need to retrieve a cache line from one of the L1 caches 161–164 in order to update the cache line.

Unfortunately, the frequent updates to L2 cache 180 can cause performance problems, especially if L2 cache employs error-correcting codes. If an update is a "partial store" that modifies only a portion of a data word in L2 cache 180, the data word must first be read out from L2 cache and then modified before the new error-correcting code can be computed. Hence, both a read operation and a subsequent write operation are required to update the error-correcting code. This can cause serious performance problems if L2 cache 180 is continually receiving such updates from the multiple L1 caches 161–164. (Note that the data word size for error-correcting code purposes is not necessarily the same as the data word size for the processor. For example, the data word size for error-correcting code purposes may be 256 bits, while the data word size for the processor architecture is 64 bits.)

Hence, what is needed is a method and an apparatus for updating an error-correcting code within a cache during a partial store operation without having to perform separate read and write operations.

SUMMARY

One embodiment of the present invention provides a system that updates an error-correcting code for a line when only a portion of the line is updated during a store operation. The system operates by receiving the store operation, wherein the store operation includes new data to be stored to the portion of the line, as well as an address of the portion of the line. Next, the system reads old data for the portion of the line from the address, and then stores the new data to the portion of the line at the address. The system also updates the existing error-correcting code for the line to reflect the new data. This involves calculating a new error-correcting code for the line from the existing error-correcting code, the old data and the new data. The system then replaces the existing error-correcting code with the new error-correcting code.

In one embodiment of the present invention, the new error-correcting code includes a Hamming code that facilitates single-error correction and double-error detection.

In one embodiment of the present invention, calculating the new error-correcting code involves: calculating a new data error-correcting code for the new data; calculating an old data error-correcting code for the old data; and exclusive-ORing the new data error-correcting code, the old data error-correcting code and the existing error-correcting code to produce the new error-correcting code.

In one embodiment of the present invention, the store operation is received at an L2 cache from an L1 cache. In this embodiment, reading the old data involves reading the old data from the L2 cache, and storing the new data involves storing the new data to the L2 cache. Furthermore, replacing the existing error-correcting code involves replacing the existing error-correcting code in the L2 cache.

In one embodiment of the present invention, the L1 cache is a write-through cache, so that all write operations to the L1 cache are propagated to the L2 cache.

In one embodiment of the present invention, the acts of reading the old data, storing the new data and updating the existing error-correcting code take place within a single memory operation. In a variation in this embodiment, the single memory operation requires only a single address decode to both read the old data and store the new data.

In one embodiment of the present invention, the line can be a cache line or a data word.

In one embodiment of the present invention, the portion of the line includes one or more bytes within the line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1B:
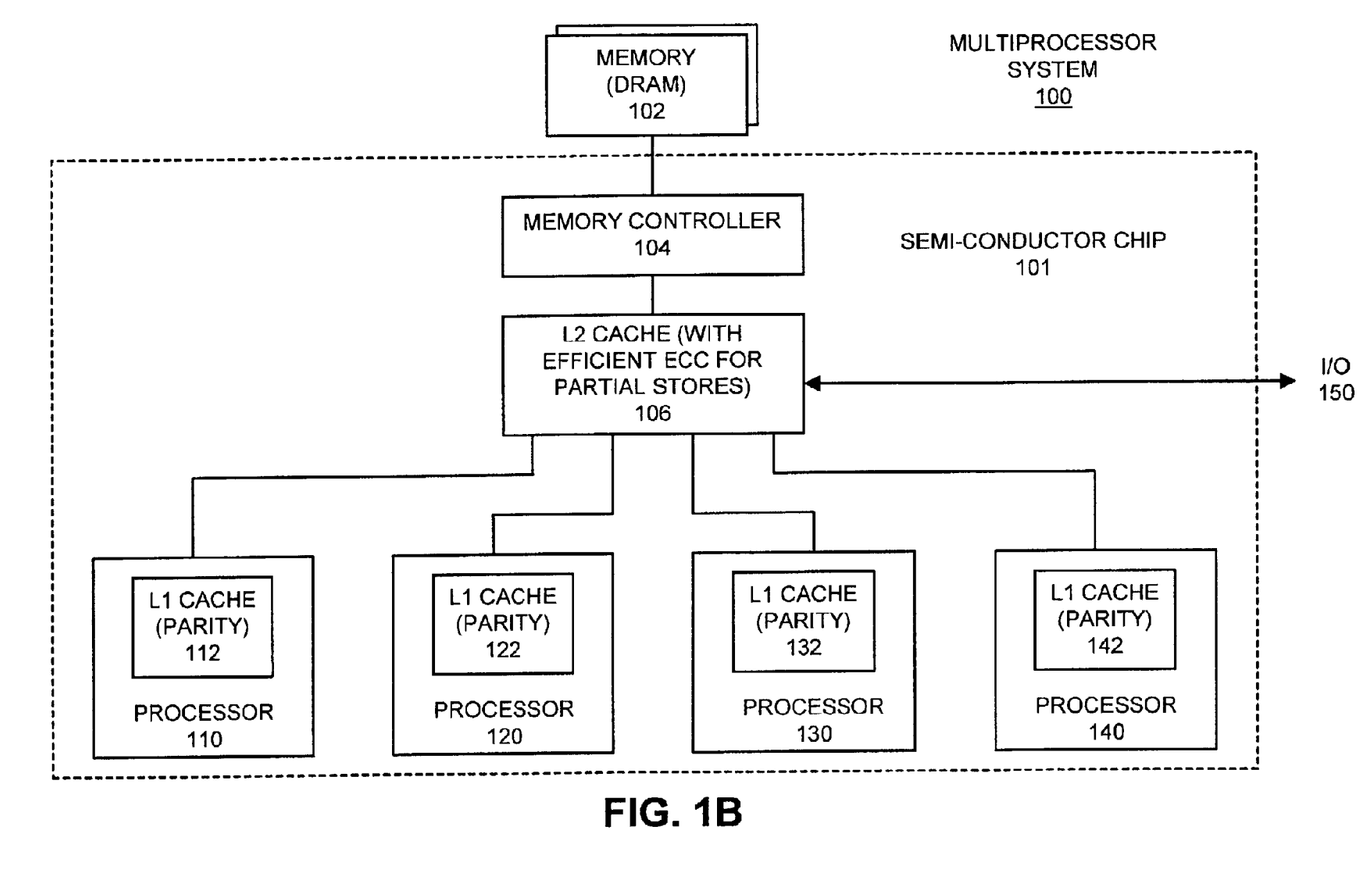
FIG. 1B illustrates a multiprocessor system in accordance with an embodiment of the present invention.

FIG. 1B illustrates a multiprocessor system 100 in accordance with an embodiment of the present invention. Note that most of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that L1 caches 112, 122, 132 and 142 may be separate instruction and data caches, or alternatively, unified instruction/data caches. L1 caches 112, 122, 132 and 142 are coupled to level two (L2) cache 106. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data item from L2 cache 106 without having to wait for L1 cache 112 to source the data item. Moreover, no forwarding network is needed to allow L1 cache 112 to source the data. Note that in one embodiment of the present invention, L2 cache 106 is an "inclusive cache", which means that all items in L1 caches 112, 122, 132 and 142 are included in L2 cache 106.

Note that there exist separate data paths from each of L1 caches 112, 122, 132 and 142 to L2 cache 106, which allows multiple updates to be received by L2 cache 106 at the same time.

In one embodiment of the present invention, L1 caches 112, 122, 132 and 142 include a parity bit for each data word to detect single bit errors. In this embodiment, L2 cache 106 includes an error-correcting code for each data word to facilitate correcting single-bit errors and to facilitate detecting double-bit errors. Since L1 caches 112, 122, 132 and 142 are write through caches, if an error arises in L1 cache 112, the correct value can be retrieved from L2 cache 106. The use of the error-correcting codes in L2 cache 106 is described in more detail below with reference to FIGS. 2–5.

Computing an Error-Correcting Code

Figure 2:
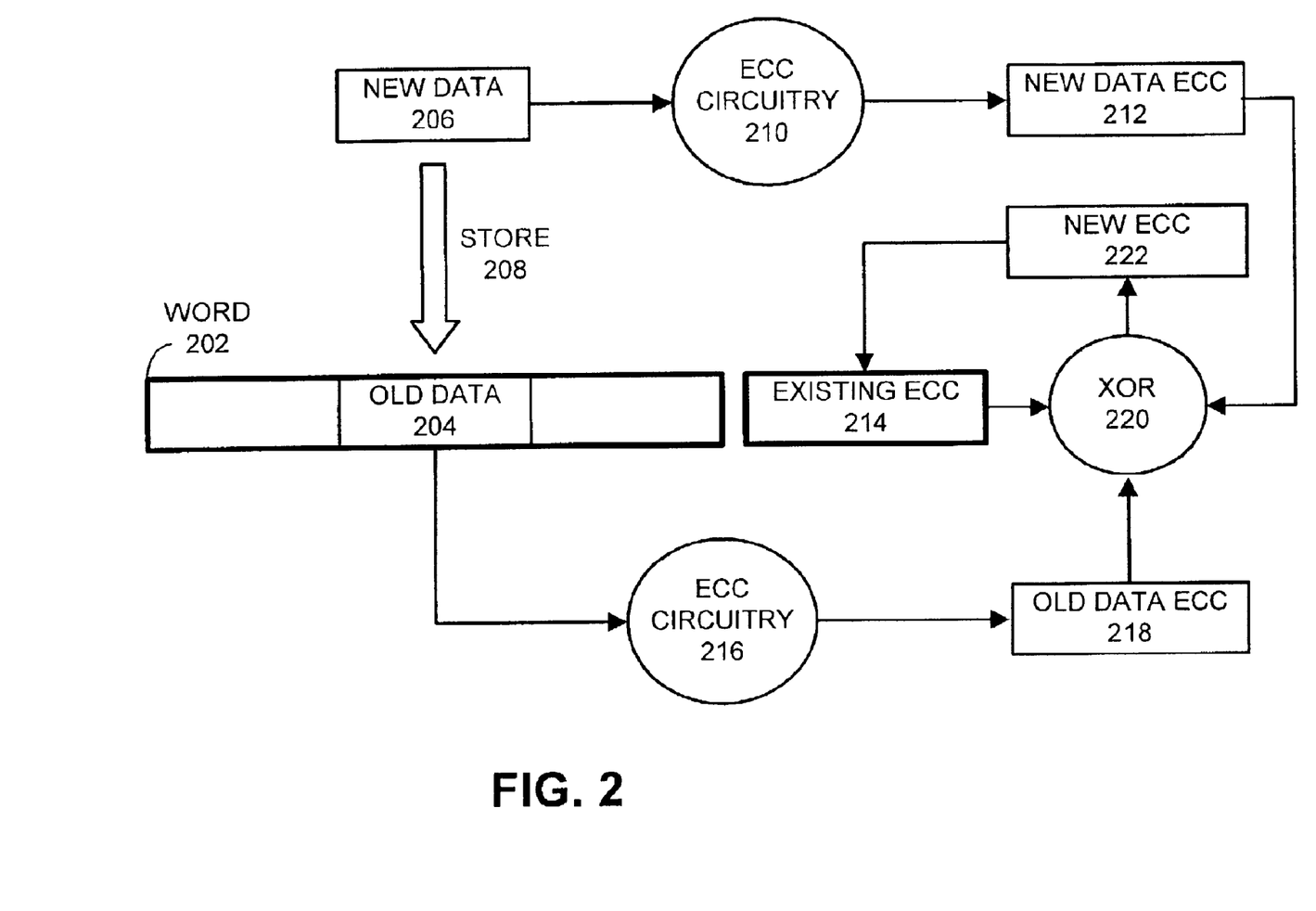
FIG. 2 illustrates how an updated error-correcting code for a partial store is computed in accordance with an embodiment of the present invention.

FIG. 2 illustrates how a new error-correcting code 222 for a partial store is computed in accordance with an embodiment of the present invention. In this example, a the partial store operation includes an address specifying the location of a portion of line 202 as well as new data 206 to be written to the portion of line 202. For example, new data 206 may be a single byte of data and line 202 may be a 64-bit word of data.

A new error-correcting code (ECC) 222 for line 202 is computed by first retrieving old data 204 from line 202, prior to writing new data 206 on top of old data 204. Note that in one embodiment of the present invention, new data 206 is written to line 202 and old data 204 is read from line 202 during a single memory operation involving only a single decode.

ECC circuitry 210 then computes new data ECC 212 from new data 206, and ECC circuitry 216 computes old data ECC 218 from old data 204. Note that ECC circuitry 210 and ECC circuitry 216 may, in fact, be the same circuitry. Also note that new data ECC 212 is computed for line 202 as if only the bits in new a data 206 are present in line 202 and all other bits are zeros. Similarly, old data ECC 218 is computed for line 202 as if only the bits in old data 204 are present in line 202 all other bits are zeros.

Next, new data ECC 212, old data ECC 218 and existing ECC 214 are exclusive-ORed together in XOR unit 220 to produce new ECC 222. Note that XOR unit 220 may actually include a first XOR circuit that combines existing ECC 214 and new data ECC 212, and a second XOR circuit that combines the result of the first XOR circuit with old data ECC 218. Also note that changing the order of these binary exclusive-OR operations does not change new ECC 222.

Finally, new ECC 222 is written over existing ECC 214 to complete the operation.

Note that the above technique works if the error-correcting code is a commonly used Hamming code that detects a double-bit error and corrects a single-bit error. See "Computer Organization and Architecture," by William Stallings, Macmillan Publishing Company, 1987, pp. 99–106. The reason this technique works is because exclusive-ORing existing ECC 214 with old data ECC 218 removes the effects of the bits of old data 204 from existing ECC 214, and exclusive-ORing the result with new data ECC 212 adds the effects of the bits of new data ECC 212 into new ECC 222.

Memory Circuitry

Figure 3:
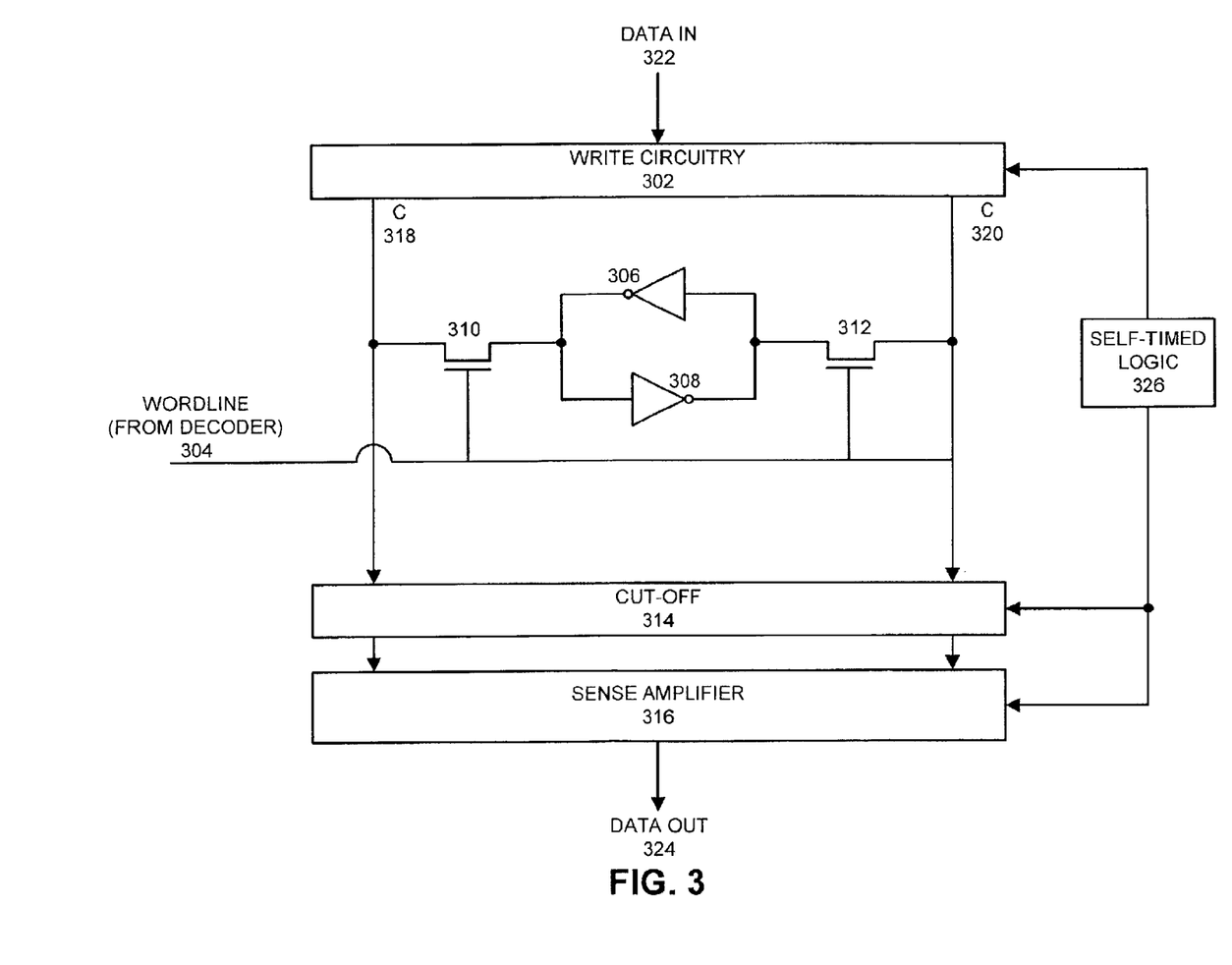
FIG. 3 illustrates circuitry that reads from a memory cell and writes to the memory cell in the same operation in accordance with an embodiment of the present invention.

FIG. 3 illustrates circuitry that reads from a memory cell and writes to the memory cell in the same operation in accordance with an embodiment of the present invention. The circuitry illustrated in FIG. 3 includes a memory cell made up of cross-coupled inverters 306 and 308.

When a specific address is selected, an address decoder activates wordline 304, which opens pass transistors 310 and 312, which electrically couple the memory cell to bitlines C 318 and C 320.

During a normal read operation, bitlines C318 and C 320 are first pre-charged, and then wordline 304 opens pass transistors 310 and 312. This causes the state on the memory cell to pull one of bitlines C 318 and C 320 to a low value, which causes sense amplifier 316 to amplify the difference in order to output the data value on data output 324. Note that cut-off circuit 314 cuts off bitlines C 318 and C 320 when one of bitlines C318 and C 320 drops below a threshold value (but not all the way to ground) in order to save power. Also note that cut-off circuit 314 can be implemented using pass transistors.

During a normal write operation, a data value feeds into data input 322 and into write circuitry 302, which produces a differential output on bitlines C318 and C 320. Wordline 304 then opens pass transistors 310 and 312, which allows write circuitry 302 to overwrite the contents of the memory cell. During a write operation, sense amplifier 316 is protected from overwriting current by cut-off circuit 314.

During a special read and write operation for a partial store, bitlines C318 and C 320 are first pre-charged, and then wordline 304 opens pass transistors 310 and 312. This causes the state on the memory cell to pull one of bitlines C 318 and C 320 to a low value, which causes sense amplifier 316 to amplify the difference in order to output the data value on data output 324. Next, cut-off circuit 314 cuts off bitlines C 318 and C 320 when one of bitlines C318 and C 320 drops below the threshold value.

In parallel with signal amplification, write circuitry 302 drives the value from data input 322 into the memory cell. This write operation takes place without having to wait for another decoding operation to take place, and without having to wait for another rise time on wordline 304. Also note that the timing of these operations is controlled by self-timed logic 326.

Note that during the sense amplification delay and after the cut-off, the system pulls up either bitline C 318 or C 320 and grounds to other. This operation is fast because transistors driving the bitlines are large. Moreover, these drive transistors are shared across a large number of memory cells so they do not take up a significant amount of chip area. Furthermore, this operation does not create additional delay because it takes place in parallel with the signal amplification.

Process of Updating an Error-Correcting Code

Figure 4:
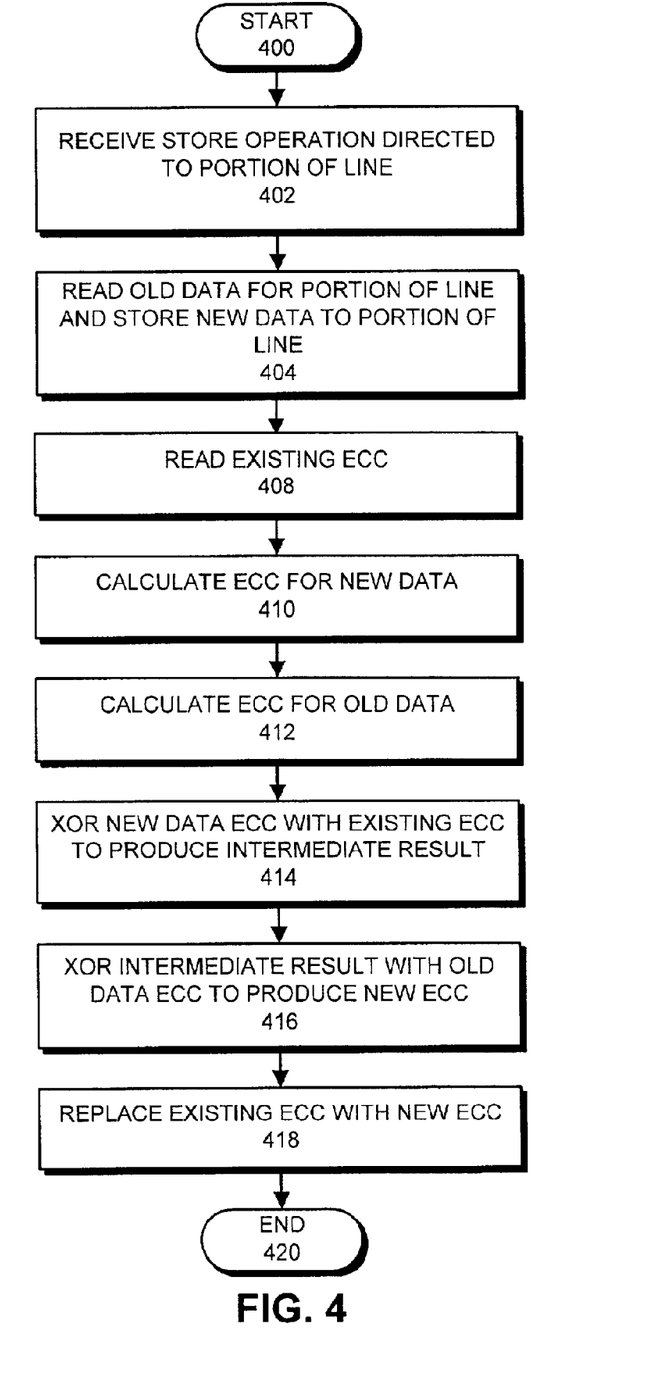
FIG. 4 is a flow chart illustrating the process of updating an error-correcting code during a partial store operation in accordance with an embodiment of the present invention.

FIG. 4 is a flow chart illustrating the process of updating an error-correcting code during a partial store operation in accordance with an embodiment of the present invention. The system starts when L2 cache 106 receives store a partial store operation directed to a portion of a line 202 (step 402). This store operation includes an address for the portion of line 202 as well as new data 206 to be written to the portion of line 202. Next, the system reads old data 204 from the portion of line 202 (step 404) while storing new data 206 to the portion of line 202. (step 404). The system also reads existing ECC 214 (step 408).

The system also calculates new data ECC 212 from new data 206 (step 410) and calculates old data ECC 218 from old data 204 (step 412).

The system then performs an exclusive-OR operation between new data ECC 212 and existing ECC 214 (step 414) to produce a result that is exclusive-ORed with old data ECC 218 to produce new ECC 222 (step 416). Finally, the system replaces existing ECC 214 with new ECC 222 to complete the operation (step 418).

Figure 5:
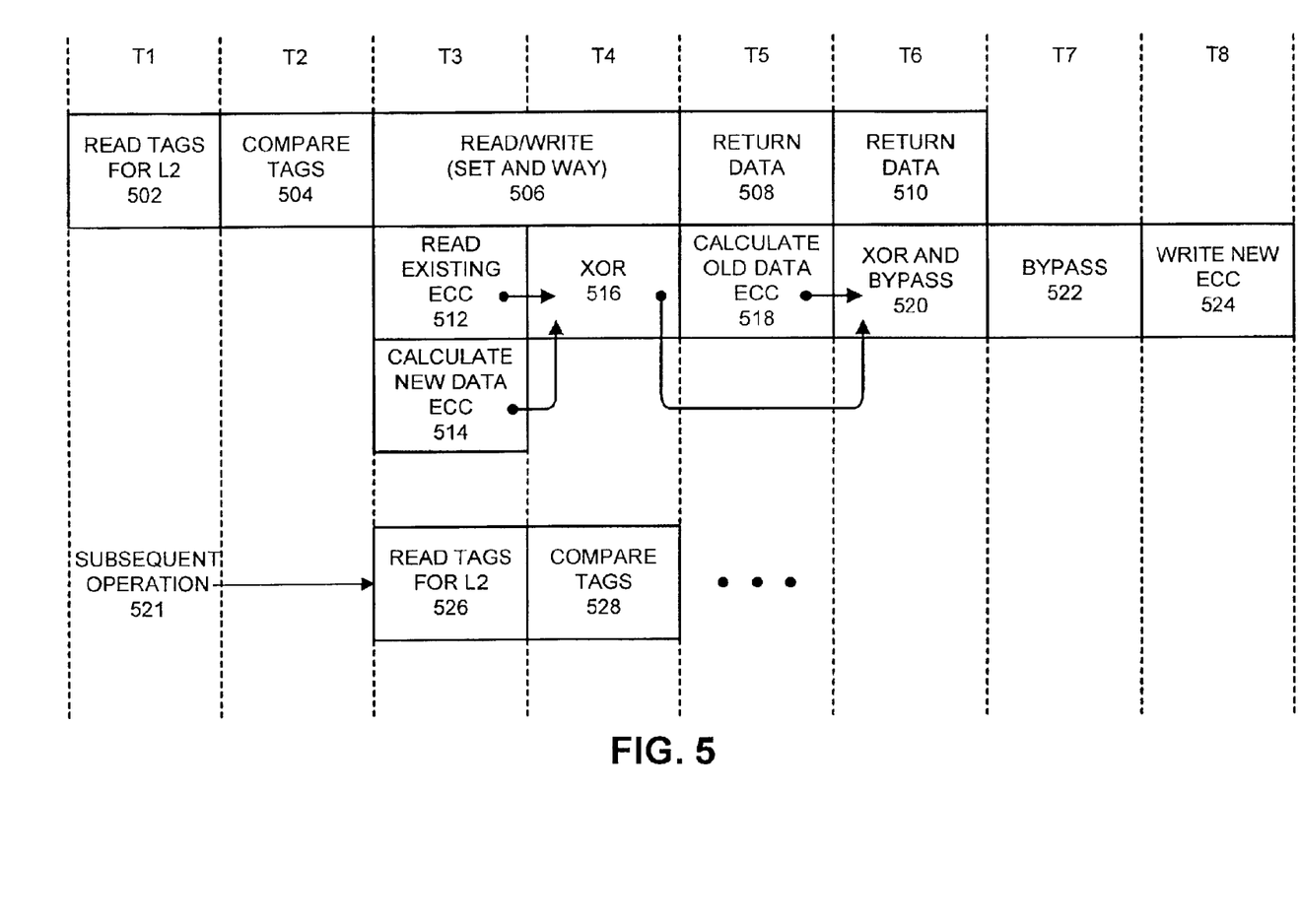
FIG. 5 is a diagram illustrating the timing of operations involved in updating an error-correcting code during a partial store operation in accordance with an embodiment of the present invention.

FIG. 5 is a diagram illustrating the timing of operations involved in updating an error-correcting code during a partial store operation in accordance with an embodiment of the present invention. This timing diagram illustrates operations during consecutive clock cycles T1–T8 from left to right.

First, the system reads L2 tags for the partial store operation (step 502), and then compares the tags to determine if the line exists in L2 cache 106 (step 504). The system then reads old data 204 from line 202 while writing new data 206 into line 202 (step 506). At the same time this read/write operation is taking place, the system reads existing ECC 214 (step 512) and calculates new data ECC 212 (step 514). The system also performs an exclusive-OR operation between new data ECC 212 and existing ECC 214 to produce a result (step 516).

Next, the system calculates old data ECC 218 (step 518), and then exclusive-ORs old data ECC 218 with the result of the previous exclusive-OR operation to produce new ECC 222 (step 520). The system then allows time for pipeline bypass (step 522) before writing new ECC 222 over existing ECC 214 (step 524). Note that a subsequent pipelined operation 521 can be started in clock cycle T3.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, although the above disclosure describes a system for updating error-correcting codes during a partial store operation, a practitioner skilled in the art will understand that the techniques described in the above disclosure can also be applied to updating an error-detecting code that performs no error-correction.

Additionally, the above disclosure is not intended to limit the present invention. The scope of the present invention is defined by the appended claims.

What is claimed is:

1. A method for updating an existing error-correcting code for a line when only a portion of the line is updated during a store operation, comprising:

receiving the store operation, wherein the store operation includes new data to be stored to the portion of the line, as well as an address of the portion of the line;

reading old data for the portion of the line from the address;

storing the new data to the portion of the line at the address; and updating the existing error-correcting code for the line to reflect the new data by, calculating a new error-correcting code for the line from the existing error-correcting code, the old data and the new data, and replacing the existing error-correcting code with the new error-correcting code:

wherein the acts of reading the old data, storing the new data and updating the existing error-correcting code take place within a single memory operation.

2. The method of claim 1, wherein the new error-correcting code includes a Hamming code that facilitates single-error correction and double-error detection.

3. The method of claim 1, wherein calculating the new error-correcting code involves:

calculating a new data error-correcting code for the new data;

calculating an old data error-correcting code for the old data; and exclusive-ORing the new data error-correcting code, the old data error-correcting code and the existing error-correcting code to produce the new error-correcting code.

4. The method of claim 1, wherein receiving the store operation involves receiving the store operation at an L2 cache from an L1 cache;

wherein reading the old data involves reading the old data from the L2 cache;

wherein storing the new data involves storing the new data to the L2 cache; and wherein replacing the existing error-correcting code involves replacing the existing error-correcting code in the L2 cache.

5. The method of claim 4, wherein the L1 cache is a write-through cache, so that all write operations to the L1 cache are propagated to the L2 cache.

6. The method of claim 1, wherein the single memory operation requires only a single address decode to both read the old data and store the new data.

7. The method of claim 1, wherein the line is one of:

a cache line; and a data word.

8. The method of claim 1, wherein the portion of the line includes one or more bytes within the line.

9. A method for updating an existing error-correcting code for a line when only a portion of the line is updated during a store operation, comprising:

receiving the store operation at an L2 cache from an L1 cache, wherein the store operation includes new data to be stored to the portion of the line;

reading old data for the portion of the line from the L2 cache;

storing the new data to the portion of the line in the L2 cache; and updating the existing error-correcting code for the line to reflect the new data by, calculating a new data error-correcting code for the new data, calculating an old data error-correcting code for the old data, and exclusive-ORing the new data error-correcting code, the old data error-correcting code and the existing error-correcting code to produce a new error-correcting code for the line, and replacing the existing error-correcting code with the new error-correcting code in the L2 cache;

wherein the acts of reading the old data, storing the new data and updating the existing error-correcting code take place within a single memory operation.

10. An apparatus that updates an existing error-correcting code for a line when only a portion of the line is updated during a store operation, comprising:

an input that is configured to receive the store operation, wherein the store operation includes new data to be stored to the portion of the line, as well as an address of the portion of the line;

a reading mechanism that is configured to read old data for the portion of the line from the address;

a storing mechanism that is configured to store the new data to the portion of the line at the address; and a calculating mechanism that is configured to calculate a new error-correcting code for the line from the existing error-correcting code, the old data and the new data; and a replacement mechanism that is configured to replace the existing error-correcting code with the new error-correcting codes;

wherein the apparatus is configured to read the old data, store the new data and update the existing error-correcting code within a single memory operation.

11. The apparatus of claim 10, wherein the new error-correcting code includes a Hamming code that facilitates single-error correction and double-error detection.

12. The apparatus of claim 10, wherein the calculating mechanism is configured to:

calculate a new data error-correcting code for the new data;

calculate an old data error-correcting code for the old data; and to exclusive-OR the new data error-correcting code, the old data error-correcting code and the existing error-correcting code to produce the new error-correcting code.

13. The apparatus of claim 10, further comprising:

an L1 cache;and an L2 cache;

wherein the input is configured to receive the store operation at the L2 cache from the L2 cache;

wherein the reading mechanism that is configured to read the old data from the L2 cache;

wherein the storing mechanism is configured store to the new data to the L2 cache; and wherein the replacement mechanism is configured to replace the existing error-correcting code with the new error-correcting code in the L2 cache.

14. The apparatus of claim 13, wherein the L1 cache is a write-through cache, so that all write operations to the L1 cache are propagated to the L2 cache.

15. The apparatus of claim 10, wherein the single memory operation requires only a single address decode to both read the old data and store the new data.

16. The apparatus of claim 10, wherein the line is one of:

a cache line; and a data word.

17. The apparatus of claim 10, wherein the portion of the line includes one or more bytes within the line.

18. A computer system that updates an existing error-correcting code for a line when only a portion of the line is updated during a store operation, comprising:

a processor;

an L1 cache within the processor;

an L2 cache accessed by one or more processors;

an input within the L2 cache that is configured to receive the store operation from the L1 cache, wherein the store operation includes new data to be stored to the portion of the line, as well as an address of the portion of the line;

a reading mechanism that is configured to read old data for the portion of the line from the address in the L2 cache;

a storing mechanism that is configured to store the new data to the portion of the line at the address in the L2 cache; and a calculating mechanism that is configured to calculate a new error-correcting code for the line from the existing error-correcting code, the old data and the new data; and a replacement mechanism that is configured to replace the existing error-correcting code with the new error-correcting code in the L2 cache;

wherein the computer system is configured to read the old data, store the new data and update the existing error-correcting code within a single memory operation.

19. The computer system of claim 18, wherein the new error-correcting code includes a Hamming code that facilitates single-error correction and double-error detection.

20. The computer system of claim 18, wherein the calculating mechanism is configured to:

calculate a new data error-correcting code for the new data;

calculate an old data error-correcting code for the old data; and to exclusive-OR the new data error-correcting code, the old data error-correcting code and the existing error-correcting code to produce the new error-correcting code.

21. A method for updating an existing error-detecting code for a line when only a portion of the line is updated during a store operation, comprising:

receiving the store operation, wherein the store operation includes new data to be stored to the portion of the line, as well as an address of the portion of the line;

reading old data for the portion of the line from the address;

storing the new data to the portion of the line at the address; and updating the existing error-detecting code for the line to reflect the new data by, calculating a new error-detecting code for the line from the existing error-detecting code, the old data and the new data, and replacing the existing error-detecting code with the new error-detecting code;

wherein the acts of reading the old data, storing the new data and updating the existing error-correcting code take place within a single memory operation.

* * * * *